Oct. 11, 1960 J. GUTKOWSKI 2,955,712
HIGH PRESSURE OIL FILTER UNIT HAVING THREADED
BOWL ASSEMBLY VALVE ACTUATING MEANS
Filed May 8, 1958 2 Sheets-Sheet 1

Inventor
JANUSZ GUTKOWSKI
by: Kavanagh & Norman

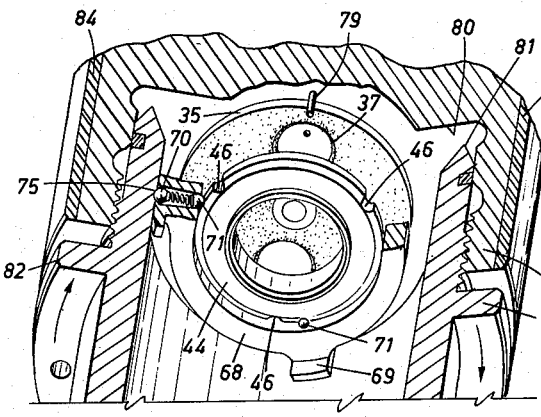
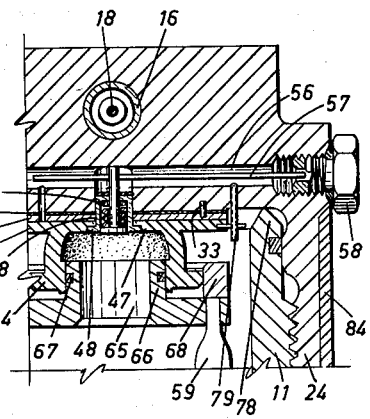
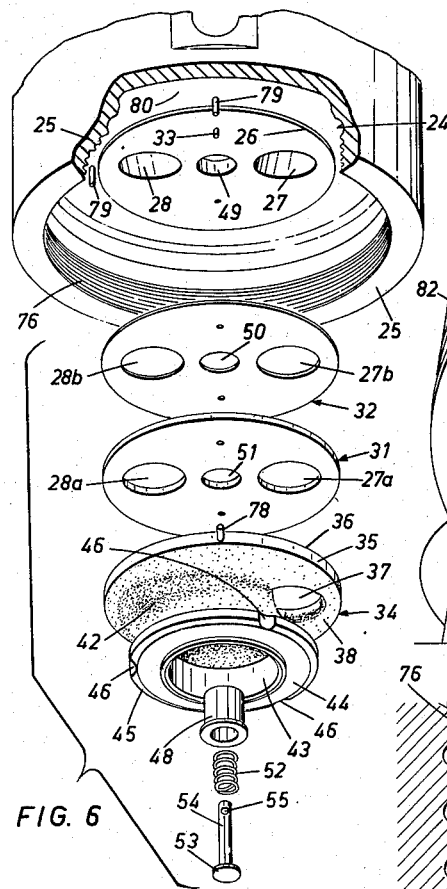
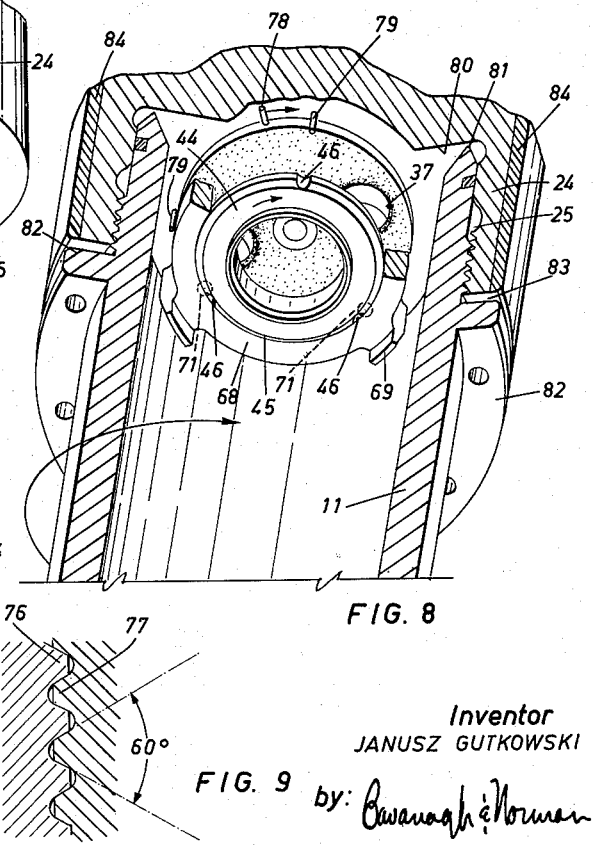
FIG. 7  FIG. 5  FIG. 6  FIG. 8  FIG. 9
Inventor
JANUSZ GUTKOWSKI United States Patent Office 2,955,712
Patented Oct. 11, 1960

2,955,712

HIGH PRESSURE OIL FILTER UNIT HAVING THREADED BOWL ASSEMBLY VALVE ACTUATING MEANS

Janusz Gutkowski, Toronto, Ontario, Canada, assignor to Parmatic Engineering Limited Filed May 8, 1958, Ser. No. 733,913

5 Claims. (Cl. 210—234)

This invention relates to a high pressure oil filter unit having threaded bowl assembly valve actuating means for internal valve structure therein, whereby removal of the filter bowl effects closure of the internal valve structure prior to physical separation of the bowl from the filter unit head structure, and wherein the said valve structure is caused to be actuated by the bowl during assembly of the latter with the head structure prior to completed assembly therewith.

In United States application Serial No. 671,975 filed July 15, 1957, for "Oil Filter Unit," rotary valve structure is provided in the head of the filter unit for severing communication between the fluid inlet and outlet openings in the head structure. A socket is provided in the head structure in communication with the rotary valve structure. The filter bowl is connected to the head structure in the socket thereof by means of bayonet locking lugs, whereby the bowl must be rotated, to effect assembly thereof with the head. A filter element within the filter bowl is supported by the latter for effecting mechanical connection with the rotary valve structure and actuation of the latter upon assembly of the filter bowl with the head structure, whereby the rotary valve structure is actuated for communication of the inlet opening of the head through the valve structure to the filter bowl hence through the filter element in the latter and to the outlet opening through the valve structure. While this prior filter unit structure is ideally suited for most applications, the high pressure requirements of filter units for use in modern aircraft imply severe stress concentrations in bayonet locking structure designs for assembly of the bowl with the head to the degree that such prior designs are impractical for high pressure service. High pressure test requirements are of the order of two thousand pounds per square inch internal pressure for general service conditions, three thousand pounds per square inch impulse pressure at six cycles per second for one thousand cycles; four thousand five hundred pounds per square inch internal proof pressure and six thousand pounds per square inch burst pressure. The foregoing requirements are typical of those for service in modern aircraft. These requirements apply to the complete assembled oil filter unit, wherein the characteristics of design must be such that undue stress concentrations do not arise. It is of interest to observe that low pressure service is ordinarily regarded by skilled persons in the manufacture of oil filter units as that class of device for service at pressures less than five hundred pounds per square inch.

It is the main object of this invention to provide an oil filter unit adapted for high pressure service in modern aircraft and the like and having an internal shut off valve structure adapted to be actuated upon removal of the filter bowl therefrom, in which the filter bowl is threaded for assembly into the head, and in which a shut off valve structure embodies a rotatable actuating element having an indexing ring rotatable therewith through a predetermined arcuate distance, the limits of which define the open and closed positions of the valve accomplished by the rotatable positioning of the valve actuating member, and in which the filter bowl embodies indexing means engageable with the indexing ring after partial threaded assembly of the bowl with the head to effect rotation of the valve actuating member upon rotation of bowl, the limit of arcuate movement of the valve assembly defining the open position of the valve structure, said indexing means being releasable to overrun said indexing ring, after opening of said valve structure, to enable full assembly of the bowl unit with the head or after closure of said valve structure to allow removal of said filter bowl from the head.

Other objects of the invention will be apparent from a study of the following specification, taken in conjunction with the accompanying drawings, wherein a specific structure and embodiment of the invention is presented by way of illustration only of a preferred form of the invention according to the concept thereof.

In the drawings:

Figure 5 is a sectional view of valve structure assembly detail on the line 5—5 of Figure 1;

Figure 6 is an exploded perspective view of the shut off valve structure illustrating the relation of the components to the valve seat in the head socket;

Figure 7 is a broken away perspective view illustrating the assembly of the filter bowl into the filter unit head immediately prior to engagement of the indexing means of the bowl with the indexing ring of the rotatable valve actuating element;

Figure 8 is a perspective view similar to that of Figure 7 but illustrating a further developed position of motion of the various components, such that the filter bowl indexing means is engaged in the indexing ring of the valve actuating element, effecting rotation of the latter toward the open position;

Figure 9 is a thread contour diagram adapted to avoid stress concentration in the threaded connection of the filter bowl to the head.

Figures 1, 2, 3, 4:
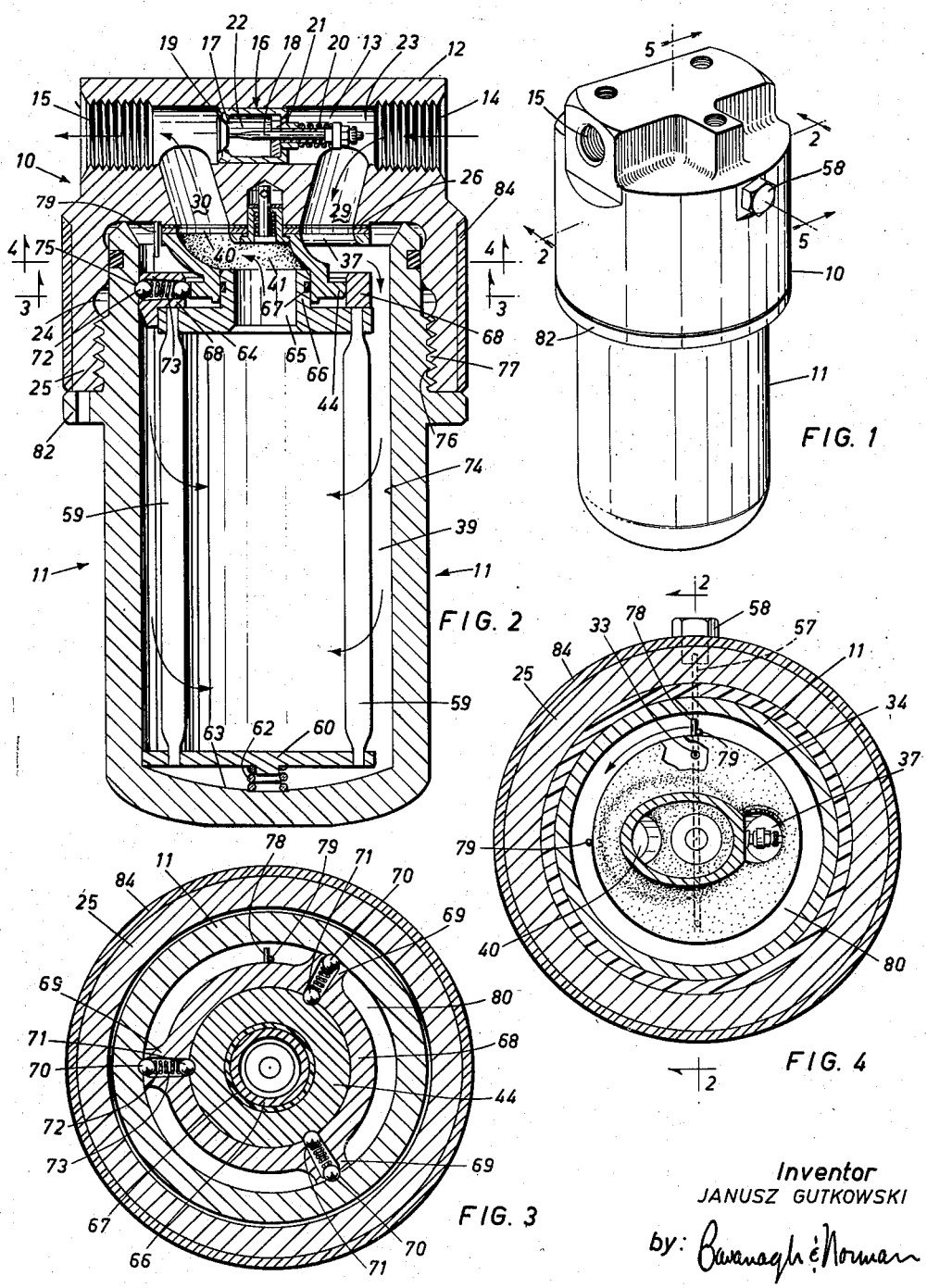
Figure 1 is a perspective view of a complete filter unit according to the invention.
Figure 2 is a sectional view of a filter unit of the invention on the line 2—2 of Figure 1.
Figure 3 is a sectional view on the line 3—3 of Figure 2.
Figure 4 is a sectional view on the line 4—4 of Figure 2.

In the drawings, the high pressure oil filter unit of the invention generally comprises the head structure 10 and removable filter bowl 11 separable therefrom. As shown in Figure 2, the head structure 10 comprises casting 12 having a through lateral bore 13 with threaded inlet and outlet openings 14 and 15 respectively adapted to receive threaded connecting fittings of communicating high pressure hydraulic lines. The bore 13 supports a valve structure 16 in the form of a hollow fixed case 17. The valve structure embodies a poppet valve member 18 seatable on the seat 19 under pressure of the biasing spring 20. The case 17 has a plurality of openings 21 communicating with the interior 22 of the hollow case 17. Pressure in the inlet chamber 23, adapted to overcome the force of the spring 20, effects opening of the poppet valve 18 from the seat 19 allowing direct communication of pressure from the inlet opening 14 to the outlet opening 15.

The head casting 12 embodies a bowl accommodating socket 24 defined by the internally threaded downwardly depending side walls 25 and the rotary valve supporting face 26. Valve inlet and outlet ports 27 and 28 are preferably diametrically opposed within the valve supporting face 26, and communicate by passages 29 and 30 with the inlet and outlet openings 14 and 15 respectively (see Figures 2 and 6). A stationary valve seat disc 31 and a stationary sealing disc 32 having corresponding openings, designated by subscripts a and b respectively, are assembled for registry on the indexing pin 33 on the valve supporting face 26. The stationary valve disc 31 is preferably formed of hard honed steel. A rotatable valve actuating member 34 serving as the movable element of the valve structure of the invention is in the form of a disc portion 35 having a disc-like valve face 36 and an inlet opening 37 in a flangelike portion 38 thereof adapted to communicate directly with the inner cavity 39 of the filter bowl 11 as shown in Figure 2. The rotatable disc valve member 35 embodies an outlet opening 40 communicating by passage 41 defined by the depending shaped side walls 42 to the filter fitting socket opening 43 concentrically disposed in the valve actuating ring or flange 44 forming a portion of the casting 34. The actuating ring 44 embodies a peripheral flange 45 embodying rotatable valve member indexing means in the form of peripheral recesses 46 thereon and directed radially inwardly. The rotatable valve member 34 has a central bore 47 adapted to accommodate the mounting bushing 48 (see also Figure 5), said bushing being adapted to extend into the accommodating bore 49 in the valve supporting face 26 of the head structure 12, and extends through corresponding openings 50 and 51 of the disc seal 32 and valve seat disc 31. The valve components are held in assembly under spring pressure by means of the spring 52 accommodated in a hollow bushing 48, and compressed by the head 53 of pin 54 extending upwardly therethrough and beyond the bushing to present a locking opening 55 therein in the transverse head bore 56 for accommodation of the locking pin 57 held therein by the retaining nut 58.

As will be evident from an examination of Figure 2 the filter bowl 11 is adapted to accommodate a filter element 59 having a base 60 supported by the spring 62 on the bottom wall 63 of the bowl. The upper end of the filter element 59 comprises a rigid filter outlet fitting 64 having an outlet port 65 and concentric bushing 66 with sealing ring 67 adapted to seat in the filter fitting socket opening 43 of the valve actuating member or rotatable valve element 34. When the filter bowl is separated from the filter unit head structure the filter element 59 is retained in the filter bowl by a retainer ring 68 (see also Figure 7) having three equally spaced outwardly directed arms 69, each carrying an outer indexing ball 70 and an inner indexing ball 71. As shown in Figure 2 a radially directed bore 72 extends through each lug and the filter element retaining ring in such manner that a biasing spring 73 may serve both the inner and outer index balls for each outwardly directed support arm 69. Each ball is retained within the bore 72 by peening the edge of the bore inwardly. The inner side walls 74 of filter bowl 11 provide suitable recesses 75 at predetermined locations whereby the filter element retaining ring may be pressed into the filter bowl effecting retraction of the balls 70 by the inner surfaces of the side walls until the balls 70 arrive for indexed seating in the recesses 75.

During assembly of the filter bowl to the filter head structure 10 the threads 76 of the filter bowl are run into the mating threads 77 of the head socket 24. Thus under clockwise rotation of the bowl, as indicated in Figure 7, the filter element retaining ring 68 is brought to a position at which the inner indexing balls 71 are forced into free running engagement over the periphery of the peripheral flange 45 of the rotatable valve actuating member 34. Further clockwise rotation of the filter bowl will cause the indexing ball 71 to engage in the indexing recess 46 of flange 45. This indexing action will occur with the three inner indexing balls 71 simultaneously. Further clockwise rotation of the filter bowl will thereafter cause the rotatable valve member, sometimes referred to herein as the valve actuating member, to rotate clockwise therewith, as shown in Figure 8, until the pin 78 extending radially from the disc portion 35 of valve member 34 engages the stationary stop pin 79 extending downwardly from the end wall 80 of the head socket 24. At this point of operation both the upper terminus or edge 81 and the outwardly directed flange 82 of the filter bowl are in spaced relation from the wall 80 and lower terminal surface 83 of the head structure. Accordingly, the filter bowl is turned further clockwise to effect full seating thereof in the head, while the rotatable valve member is restrained against further rotational movement by engagement of pin 78 with pin 79. To effect this desired operation the indexing balls 71 rise out of the indexing recesses 46 to ride freely on the periphery of the peripheral flange 45 of actuating ring 44.

The filter bowl is removed by effecting counter-clockwise rotation thereof. After a relatively small angle of counter-clockwise motion the indexing balls will seat in the indexing recesses 46. Thereafter, during further counter-clockwise rotation of the filter bowl, the rotatable valve member will be rotated therewith until pin 78 engages stop pin 79. Further counter-clockwise rotation of the filter bowl will effect disengagement of the indexing balls 71 from the recesses 46, and sliding motion thereof about the periphery of the peripheral flange 45 until disengagement of the indexing balls occurs, following which the filter bowl is free for final unthreading from the head structure.

It will be appreciated that the diametrically opposed positioning of the inlet and outlet openings of the valve structure will require a ninety degree rotation of the rotatable valve member between fully open and fully closed positions of the valve structure. It is only necessary to provide for a thread length for assembly of the filter bowl into the head sufficient to effect an axial motion in assembly of the bowl allowing for; additional thread assembly before engagement of the indexing means, motion of the indexing means sufficient to effect articulation of the valve from the closed to the open position, or from the open to the closed position, and tolerance of motion for further turning of the bowl after valve opening to ensure that the valve has, in fact, arrived at the open position. Accordingly, indexing engagement for valve actuation is accomplished at a location intermediate of final assembly and physical separation of the filter bowl and the filter head structure. Regardless of the manner in which the threads of the filter bowl are started in the threads of the head socket the valve must always arrive at the correct open position upon assembly of the filter bowl and head. Likewise the valve structure will always be closed prior to final removal of the filter bowl from the filter head structure. In the preferred form of the invention substantially all of the components are made of aluminum or other lightweight material with the exception of spring material, indexing balls and the valve seat disc 31 and except the sealing rings or members shown. The subjection of filter units made from lightweight relatively low strength metal gives rise to substantial problems where stress concentrations may arise. Accordingly, it is preferred to shrink a steel tension ring or sleeve 84 about the side walls 25 of socket 24. In addition, it is preferred to provide a special thread contour for the threads 76 and 77 of the form disclosed in Figure 9 in which the included tooth angle is sixty degrees, the radius between threads at a radius equal to about one-half the height of the thread, that is one-half thread depth, and wherein the apexes of the threads thus are flattened to conform to a cord line extending between the ends of the radius of the apexes. By this means a thread contour is provided in which each sharp edge embodies an including angle substantially greater than ninety degrees. In addition the curve provided at the thread roots avoids stress concentration in this region.

It is intended that the present disclosure should not be construed in any limiting sense other than that indicated by the scope of the following claims having regard to the prior art.

What I claim as my invention is:

1. A high pressure oil filter unit comprising in combination: a filter element having an outlet fitting; a filter bowl having an open end and adapted to support said filter element therein to dispose the outlet fitting thereof in said open end; an inlet opening at the open end of said bowl; a filter head including a filter bowl socket adapted to receive said filter bowl end for manual rotation of the latter therein and communication with said inlet opening; inlet and outlet fittings for communicating fluid into and out of said head; rotatable valve structure in said head, an actuating ring forming a concentric part of said rotatable valve structure; a retaining ring for retaining said filter element in said filter bowl and having an opening adapted slidably to accommodate said actuating ring therein at an intermediate position of assembly of said filter bowl and said filter head; thread means on said bowl and said head of predetermined minimum length for assembly of said bowl in said head; releasable means in the form of an inwardly directed spring biased ball in said retaining ring disposed in the opening thereof and a peripheral ball recess in said retaining ring adapted to accept said ball for rotation of said actuating ring thereby during rotation of said bowl for threaded assembly and threaded disassembly of the latter with said head, said releasable means effecting unrestrained rotation of said actuating ring and valve structure during accommodation of said actuating ring in said retaining ring opening; stop means limiting the rotation of said valve structure to define an open position of the latter and restraining said valve structure for release of said releasable means; and stop means limiting the rotation of said valve structure by said releasable means during unthreading of said bowl from said head and defining a closed position for said valve structure.

2. A high pressure oil filter unit as claimed in claim 1 and inlet and outlet passages in said rotatable valve structure, said actuating ring thereof forming a portion of the outlet passage of said valve structure; a filter element outlet socket forming a part of said actuating ring and adapted to receive said outlet fitting of said filter element upon assembly of said filter bowl with said head.

3. A high pressure oil filter unit comprising in combination: a filter element having an outlet fitting; a filter bowl having an open end and adapted to support said filter element therein to dispose the outlet fitting thereof in said open end; an inlet opening at the open end of said bowl; a filter head including a filter bowl socket adapted to receive said filter bowl end for manual rotation of the latter therein and communication with said inlet opening; inlet and outlet fittings for communicating fluid into and out of said head; rotatable valve structure in said head, an actuating ring forming a concentric part of said rotatable valve structure; a retaining ring for retaining said filter element in said filter bowl and having an opening adapted slidably to accommodate said actuating ring therein at an intermediate position of assembly of said filter bowl and said filter head; thread means on said bowl and said head of predetermined minimum length for assembly of said bowl in said head; releasable means comprising a spring biased ball disposed in the opening of said retaining ring and a peripheral ball recess in said retaining ring effecting unrestrained rotation of said actuating ring and valve structure during accommodation of said actuating ring in said retaining ring opening; stop means limiting the rotation of said valve structure to define an open position of the latter and restraining said valve structure for release of said releasable means; stop means limiting the rotation of said valve structure by said releasable means during unthreading of said bowl from said head and defining a closed position for said valve structure; means defining inlet and outlet passages in said rotatable valve structure, said actuating ring forming a part of the outlet structure thereof; and a filter element outlet fitting accepting socket defined by said actuating ring and adapted to accept said outlet fitting upon full assembly of said filter bowl with said head.

4. A high pressure oil filter unit as claimed in claim 3 in which said releasable means comprises an inwardly directed spring biased ball in said retaining ring disposed in the opening thereof and a peripheral ball recess in said retaining ring adapted to accept said ball for rotation of said actuating ring thereby during rotation of said bowl for threaded assembly and threaded disassembly of the latter with said head.

5. A high pressure oil filter unit as claimed in claim 3 in which said releasable means comprises an inwardly directed spring biased ball in said retaining ring disposed in the opening thereof and a peripheral ball recess in said retaining ring adapted to accept said ball for rotation of said actuating ring thereby during rotation of said bowl for threaded assembly and threaded disassembly of the latter with said head; and depressible ball retaining means for retaining said retaining ring in assembly within said filter bowl.

References Cited in the file of this patent

UNITED STATES PATENTS

| | | |
|---|---|---|
| 86,158 | Houston | Jan. 26, 1869 |
| 1,613,166 | Gregory | Jan. 4, 1927 |
| 1,617,048 | Gregory | Feb. 8, 1927 |
| 1,624,526 | Bohmsack | Apr. 12, 1927 |
| 1,797,198 | Ingersoll | Mar. 17, 1931 |
| 1,840,883 | Brecher | Jan. 12, 1932 |
| 2,418,777 | Le Clair | Apr. 8, 1947 |

FOREIGN PATENTS

| | | |
|---|---|---|
| 127,137 | Australia | Mar. 15, 1948 |
| 464,360 | Canada | Apr. 11, 1950 |
| 618,523 | Great Britain | Feb. 23, 1949 |